(12) United States Patent
Lin et al.

(10) Patent No.: US 9,354,754 B2
(45) Date of Patent: May 31, 2016

(54) TOUCH DEVICES HAVING DRIVING UNIT FOR DETECTING A TOUCH POINT POSITION AND TOUCH POINT POSITION DETECTION METHODS THEREOF

(75) Inventors: Yang-Kai Lin, Taipei County (TW); De-Yu Kao, Taipei (TW)

(73) Assignee: PRINCETON TECHNOLOGY CORPORATION, Taipei County (TW)

( * ) Notice: Subject to any disclaimer, the term of this patent is extended or adjusted under 35 U.S.C. 154(b) by 505 days.

(21) Appl. No.: 13/185,916

(22) Filed: Jul. 19, 2011

(65) Prior Publication Data
US 2012/0013558 A1    Jan. 19, 2012

(30) Foreign Application Priority Data
Jul. 19, 2010 (TW) .............................. 99123621 A

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01)

(58) Field of Classification Search
CPC ................................ G06F 3/044; G06F 3/0416
USPC .................................................. 345/173–178
See application file for complete search history.

(56) References Cited

U.S. PATENT DOCUMENTS

| 2008/0079699 | A1* | 4/2008 | Mackey | 345/174 |
| 2008/0158167 | A1* | 7/2008 | Hotelling et al. | 345/173 |
| 2010/0245286 | A1* | 9/2010 | Parker | 345/174 |
| 2010/0283752 | A1* | 11/2010 | Maeda | 345/173 |

* cited by examiner

*Primary Examiner* — Gustavo Polo
(74) *Attorney, Agent, or Firm* — Muncy, Geissler, Olds & Lowe, P.C.

(57) ABSTRACT

A detection method for detecting a touch point on a touch panel is provided. The detection method includes: (1) providing a touch panel which is capable of being divided into even unit regions; (2) defining a plurality of unit regions as a detection region by a control unit; (3) detecting the detection region to obtain a position of the touch point in the corresponding unit region by a driving unit; (4) when the detecting is failed to obtain the position, re-defining the number of unit regions consisting of the detection region by the control unit; and (5) when the position is detected, memorizing the position into a memory unit. The number of unit regions defined in the step (4) is equal to a half of the number of unit regions defined in the step (2).

10 Claims, 7 Drawing Sheets

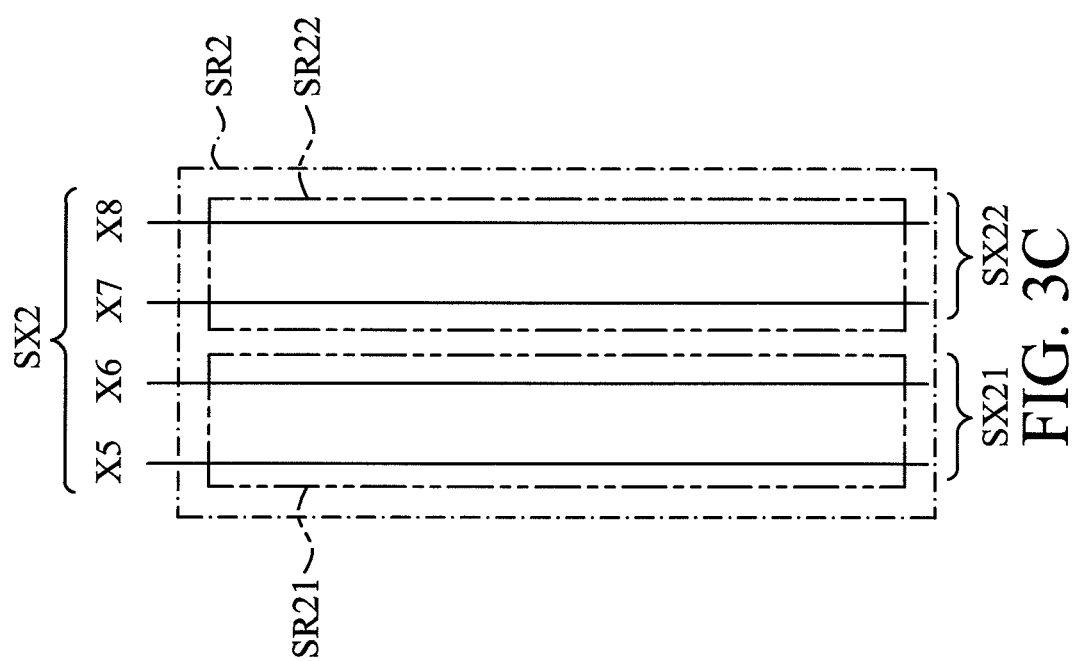

TOUCH DEVICES HAVING DRIVING UNIT FOR DETECTING A TOUCH POINT POSITION AND TOUCH POINT POSITION DETECTION METHODS THEREOF

CROSS REFERENCE TO RELATED APPLICATIONS

This application claims the benefit of Taiwan application Serial No. 99123621 filed Jul. 19, 2010, the subject matter of which is incorporated herein by reference.

BACKGROUND OF THE INVENTION

1. Field of the Invention

The invention relates to a detection method, and more particularly to a detection method for a touch panel to detect touch points by scanning divided regions.

2. Description of the Related Art

FIG. 1 shows a conventional capacitive touch panel. Referring to FIG. 1, a capacitive touch panel 1 comprises a plurality of driving lines X1-Xn and a plurality of sensing lines Y1-Ym. The driving lines X1-Xn interlaces with the sensing lines Y1-Tm, and one set of the interlaced driving line and sensing line corresponds to one sensing cell. For example, the interlaced driving line X1 and the sensing line Y1 corresponds to one sensing cell DC10. The touch panel 1 mainly comprises two conductive layers. The driving lines X1-Xn are formed on one conductive layer, while the sensing lines Y1-Ym are formed on the other conductive layer. Generally, during the detection of touch points, the driving lines X1-Xn are scanned one by one. When one driving line is scanned, voltage signals on the sensing lines Y1-Ym are read out sequentially, and it is determined whether the corresponding sensing cells have been touched to serve as touch points according to the read voltage signals.

Assume that reading out the voltage signal of one sensing line takes one unit of time. For the detection of touch points during one frame, it takes n*m units of time. When above detection method for detecting touch points is applied in a touch panel with a large area, much time is consumed for the scanning operation of the driving lines in a non-touch region and the reading operation of the voltage signals on the sensing lines. Thus, the time for detecting touch points is increased, and more hardware resource is used.

Thus, it is desired to provide a detection method which can efficiently detect touch points for shortening a detection time and decreasing hardware resource consumption.

BRIEF SUMMARY OF THE INVENTION

An exemplary embodiment of a detection method for detecting a touch point on a touch panel is provided. The detection method comprises (1) providing a touch panel which is capable of being divided into even unit regions; (2) defining a plurality of unit regions as a detection region by a control unit; (3) detecting the detection region to obtain a position of the touch point in the corresponding unit region by a driving unit; (4) when the detecting is failed to obtain the position, re-defining the number of unit regions consisting the detection region by the control unit; and (5) when the position is detected, memorizing the position into a memory unit. The number of unit regions defined in the step (4) is equal to a half of the number of unit regions defined in the step (2).

An exemplary embodiment of a touch device for controlling a touch penal is provided. The touch panel connecting a plurality of driving lines and a plurality of sensing lines. The driving lines interlace with the sensing lines, and each set of the interlaced driving line and sensing line corresponds to a sensing cell. Each driving line corresponds to a unit region. The touch device comprises a control unit and a driving unit. The control unit initially defines a plurality of unit regions as a detection region. The driving unit is coupled to the control unit and detects the detection region to obtain a position of a touch point in the corresponding unit region. When the driving unit detects the position, the control unit memorizes the position into a memory unit. When the driving unit does not the position, the control unit re-defines the number of unit regions consisting of the detection region. The re-defined number of unit regions is equal to a half of the initial-defined number of unit regions defined by the control unit.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIGS. 3A-3C are diagrams showing driving-line groups according to an exemplary embodiment;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
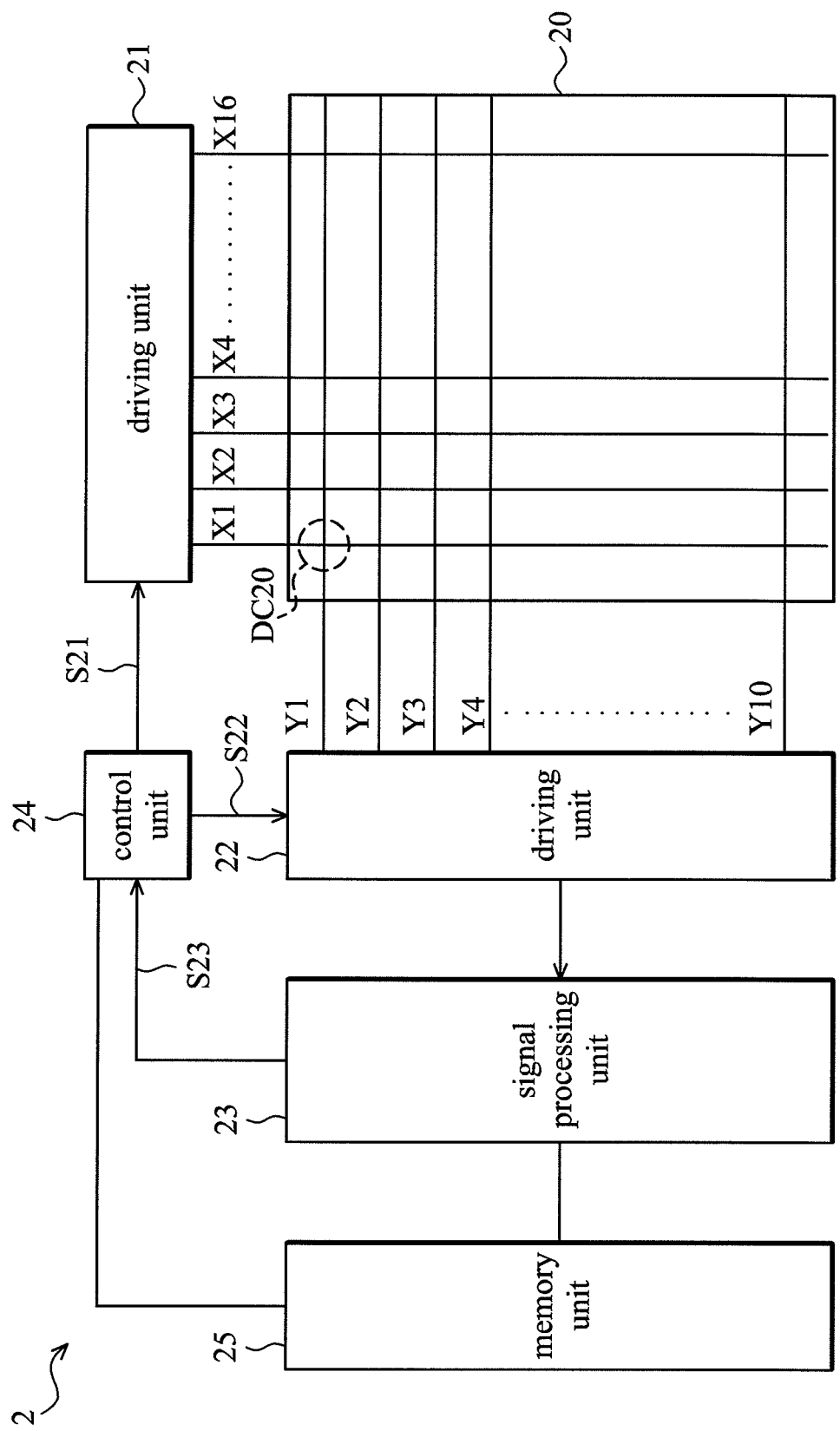
FIG. 2 shows an exemplary embodiment of a touch device.

Touch devices are provided. In an exemplary embodiment of a touch device in FIG. 2, a touch device 2 comprises a touch panel 20, driving units 21 and 22, a signal processing unit 23, a control unit 24, and a memory unit 25. The touch panel 20 connects a plurality of driving lines and a plurality of sensing lines Y1-Y10. In the embodiment, 16 sixteen driving lines X1-X16 and ten sensing lines Y1-Y10 are given as an example for description. However, the number of the driving lines and the number of sensing lines are not limited to the above example and determined according to system requirements. The driving lines X1-X16 interlace with the sensing lines Y1-Y10, and one set of the interlaced driving line and sensing line corresponds to one sensing cell. For example, the set of the interlaced driving line X1 and the sensing line Y1 corresponds to a sensing cell DC20. The driving unit 21 is coupled to the driving lines X1-X16 and scans the driving lines X1-X16 according to a control signal S21. The driving unit 22 is coupled to the sensing lines Y1-Y10 and reads out voltage signals on the sensing lines Y-1T10 according to a control signal S22. In the embodiment, the region corresponding to one of the driving lines X1-X16 is referred as a unit region. Thus, the touch panel 20 comprises even unit regions.

When one driving line is scanned by the driving unit 21, the driving unit 22 reads out the voltage signals on the sensing lines Y1-Y10, and the signal processing unit 23 receives these voltage signals to determine whether the sensing cells corresponding to the scanned driving line and the sensing lines Y1-Y10 have been touched. The signal processing unit 23 generates a detection signal S23 according to the determination result. Accordingly, the control unit 24 can generate the control signals S21 and S22 according to the detection signal S23 representing the determination result and also control the driving units 21 and 22 to perform the scanning operation of the sequent driving line and the reading operation of the voltage signals on the sensing lines.

Figure 3A:
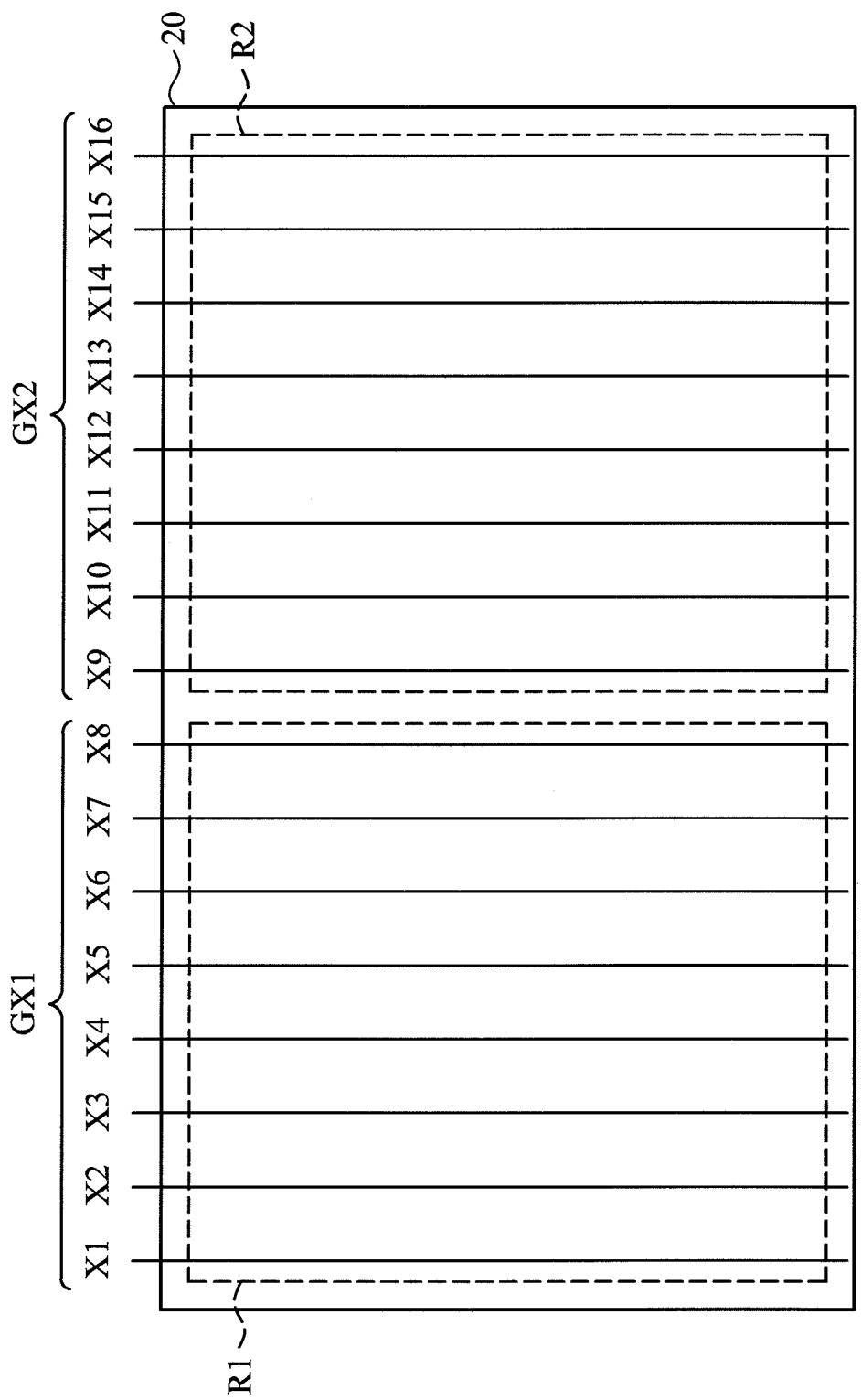

When it is desired to detect whether one sensing cell in the touch panel 20 has been touched to serve as a touch point, the touch device 2 performs a detection operation to one driving-line group among the driving lines X1-X16. For example, referring to FIGS. 2 and 3A, the touch device 2 performs a detection operation to one driving-line group GX1 composed by the driving lines X1-X8. In other words, according to the embodiment of the invention, the touch panel 20 is divided into a plurality of sensing regions to increase detection efficiency of the touch panel. The touch device 2 performs the detection operation to a sensing region R1 of the touch panel 20 which corresponds to the driving-line group GX1.

Figure 3B:
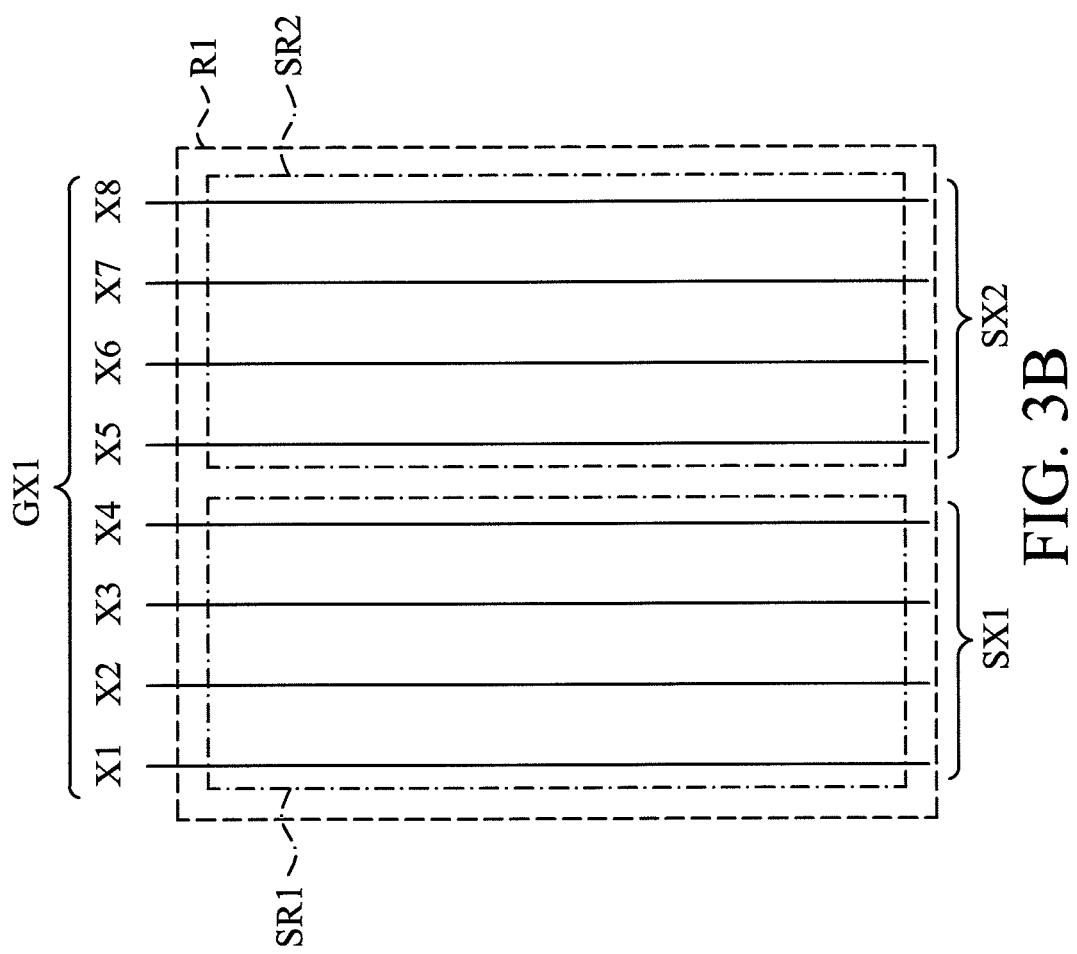

Referring to FIG. 3B, in the detection operation of the driving-line group GX1, the control unit 24 defines the driving-line group GX1 as a main driving-line group. The control unit 24 generates the control signal S21 according to the detection signal S23 to control the driving unit 21 to sequentially scan a subordinate driving-line group SX1, which comprises the driving lines X1-X4, in the main driving-line group GX1. The control unit 24 defines the region, which corresponds to the subordinate driving-line group SX1, in the touch panel 20 as a detection region SR1. The detection region SR1 comprises the corresponding unit regions of the driving lines X1-X4; that is four unit regions. The control unit 24 also generates the control signal S22 to control the driving unit 22 to read out the voltage signals on the sensing lines Y1-Y10. In detail, when the driving unit 21 scans one driving line (such as the driving line X1) in the subordinate driving-line group SX1 according to the control signal S21, the driving unit 22 reads out the voltage signals on the sensing lines Y1-Y10 according to the control signal S22, and the signal processing unit 23 receives the read voltage signals to determine whether one of the sensing cells which correspond to the scanned driving line X1 and the sensing lines Y1-Y10 has been touched. Then, when the driving unit 21 sequentially scans the next driving line X2 in the subordinate driving-line group SX1 according to the control signal S21, the driving unit 22 reads out the voltage signals on the sensing lines Y1-Y10 according to the control signal S22, and the signal processing unit 23 receives the read voltage signals to determine whether one of the sensing cells which correspond to the scanned driving line X2 and the sensing lines Y1-Y10 has been touched. By performing the scanning operation to the driving lines X1-X4 in the subordinate driving-line group SX1 and the reading operation of the voltage signals to the sensing lines Y1-Y10, the signal processing unit 23 can determine whether one of the sensing cells which correspond to the scanned driving lines X1-X4 and the sensing lines Y1-Y10 has been touched. That is, the signal processing unit 23 can detect whether one touch point has occurred in the detection region SR1.

When the signal processing unit 23 determines that one of the sensing cells corresponding to the scanned driving lines X1-X4 and the sensing lines Y1-Y10 has been touched (that is one touch point has occurred in the detection region SR1), the signal processing unit 23 generates the detection signal S23 to the control unit 24, so that the control unit 24 memorizes the position of the touched sensing cell in the corresponding unit region in the detection region SR1 into the memory unit 25 (that is the control unit 24 memorizes the position of the touch point in the corresponding unit region into the memory unit 25). Moreover, the touch device 2 stops performing the detection operation to the driving-line group GX1, and the detection procedure of touch points is finished. When the touch device 2 performs the next detection procedure of touch points, a detection operation is performed to the sensing region which is not detected in the previous detection procedure of touch points (that is in a sensing region R2 corresponding to a driving-line group GX2 in the embodiment).

When the signal processing unit 23 determines that the sensing cells corresponding to the scanned driving lines X1-X4 and the sensing lines Y1-Y10 have not been touched (that is there is no touch point in the detection region SR1), the touch device 2 performs a detection operation to a subordinate driving-line group SX2 composed by the driving lines X5-X8.

Referring to FIG. 3C, in the detection operation of the subordinate driving-line group SX2, the control unit 24 defines the subordinate driving-line group SX2 as a main driving-line group. The control unit 24 generates the control signal S21 according to the detection signal S23 to control the driving unit 21 to sequentially scan a subordinate driving-line group SX21 in the main driving-line group SX2 which comprises the driving lines X5-X6. The control unit 24 defines the region, which corresponds to the subordinate driving-line group SX21, in the touch panel 20 as a detection region SR21. The detection region SR21 comprises the corresponding unit regions of the driving lines X5-X6; that is two unit regions. The control unit 24 also generates the control signal S22 to control the driving unit 22 to read out the voltage signals on the sensing lines Y1-Y10. By performing the scanning operation to the driving lines X5-X6 in the subordinate driving-line group SX21 and the reading operation of the voltage signals to the sensing lines Y1-Y10, the signal processing unit 23 can determine whether one of the sensing cells which correspond to the scanned driving lines X5-X6 and the sensing lines Y1-Y10 has been touched. That is, the signal processing unit 23 can detect whether one touch point has occurred in the detection region SR21. When the signal processing unit 23 determines that one of the sensing cells corresponding to the scanned driving lines X5-X6 and the sensing lines Y1-Y10 has been touched (that is one touch point has occurred in the detection region SR21), the signal processing unit 23 generates the detection signal S23 to the control unit 24, so that the control unit 24 memorizes the position of the touched sensing cell in the corresponding unit region in the detection region SR1 into the memory unit 25 (that is the control unit 24 memorizes the position of the touch point in the corresponding unit region into the memory unit 25). Moreover, the touch device 2 stops performing the detection operation to the subordinate driving-line group SX2. Then, the touch device 2 can be switched to perform a detection operation to the driving-line group GX2. When the signal processing unit 23 determines that the sensing cells corresponding to the scanned driving lines X5-X6 and the sensing lines Y1-Y10 have not been touched (that is there is no touch point in the detection region SR21), the touch device 2 performs a detection operation to a subordinate driving-line group SX22 composed by the driving lines X7-X8.

According to FIGS. 3B-3C, in the detection operation of the driving-line group GX1, the detection region SR1 comprises four unit regions respectively corresponding to the driving lines X1-X4, and in the detection operation of the subordinate driving-line group SX2, the detection region SR21 comprises two unit regions respectively corresponding to the driving lines X5-X6. Accordingly, when no touch point is detected in the detection region SR1, the number of unit regions consisting of the detection region SR21 which is detected sequentially is equal to a half of the number of unit regions consisting of the detection region SR1.

According to the above description, by repeatedly defining a main driving-line group (that is a detection region) to repeatedly perform a detection operation, it can be detected whether one of the sensing cells which correspond the driving lines X1-X8 and the sensing lines Y1-Y10 has been touched. When the control unit 24 determines that the touch device 2 did not detect one touched sensing cell after the touch panel 2 performed the detection operations by a predetermined number, the driving unit 21 scans the driving lines which have not experienced a detection operation yet according to the control signal S21 to detect whether one of the corresponding sensing cells has been touched. If no touched sensing cell is detected, the touch device 2 performs the same detection operation of the driving-line group GX1 to the driving-line group GX2 composed by the driving lines X9-X16. In other words, the touch device 2 performs the detection operation to the sensing region R2 of the touch panel 20 corresponding to the driving-line group GX2.

For example, assume that the predetermined number is equal to two. When the control unit 24 determines that the touch device 2 did not detect one touched sensing cell after the touch panel 2 performed the detection operation for two times (that is the number of detecting times is equal to two; one detection operation for the driving-line group GX and the other detection operation for the subordinate driving-line group SX2), the driving unit 21 scans the subordinate driving-line group SX22 according to the control signal S21 to detect whether one of the corresponding sensing cells has been touched. If no touched sensing cell is detected, the touch device 2 performs the same detection operation of the driving-line group GX1 to the driving-line group GX2 composed by the driving lines X9-X16. If it is detected that one of the sensing cells which correspond to the subordinate driving-line group SX22 has been touched, the signal processing unit 23 generates the detection signal S23 to the control unit 24, so that the control unit 24 memorizes the position of the touched sensing cell in the corresponding unit region in the detection region SR12 into the memory unit 25 (that is the control unit 24 memorizes the position of the touch point in the corresponding unit region into the memory unit 25). The touch device 2 then can be switched to perform a detection operation to the driving-line group GX2.

Thus, by repeatedly defining a man driving-line group in the driving-lines group GX2 to repeatedly perform a detection operation, it can be detected whether one of the sensing cells which correspond to the driving lines X9-X16 and the sensing lines Y1 Y10 has been touched.

The above predetermined number is set as two for an example of the embodiment without limitation. The predetermined number can be determined according to system requirements and size of applied touch panels.

In the embodiment, the number of driving lines in the driving-line group GX1 is equal to the number of driving lines in the driving-line group GX2. Moreover, for each detection operation, one main driving-line group is divided into two subordinate driving-line groups, and the number of driving lines in one subordinate driving-line group is equal to the number of driving lines in the other subordinate driving-line group.

In other embodiments, the area of the detection region R1 corresponding to the driving-line group GX1 is equal to the area of the detection region R2 corresponding to the driving-line group GX2.

According to the above embodiment, the driving lines X1-X16 are divided into several groups. When the touch panel 2 desires to detect whether one sensing cell in the touch panel 20 has been touched, the control unit 24 controls the driving unit 21 to perform a detection operation to one driving-line group each time until one touched sensing cell is detected. Thus, each time when the touch device 2 desires to detect whether one sensing cell in the touch panel 20 has been touched, the control unit 24 does not require scanning all of the driving lines X1-X16; thereby shortening detection duration and degrading resource consumption.

Figure 1:
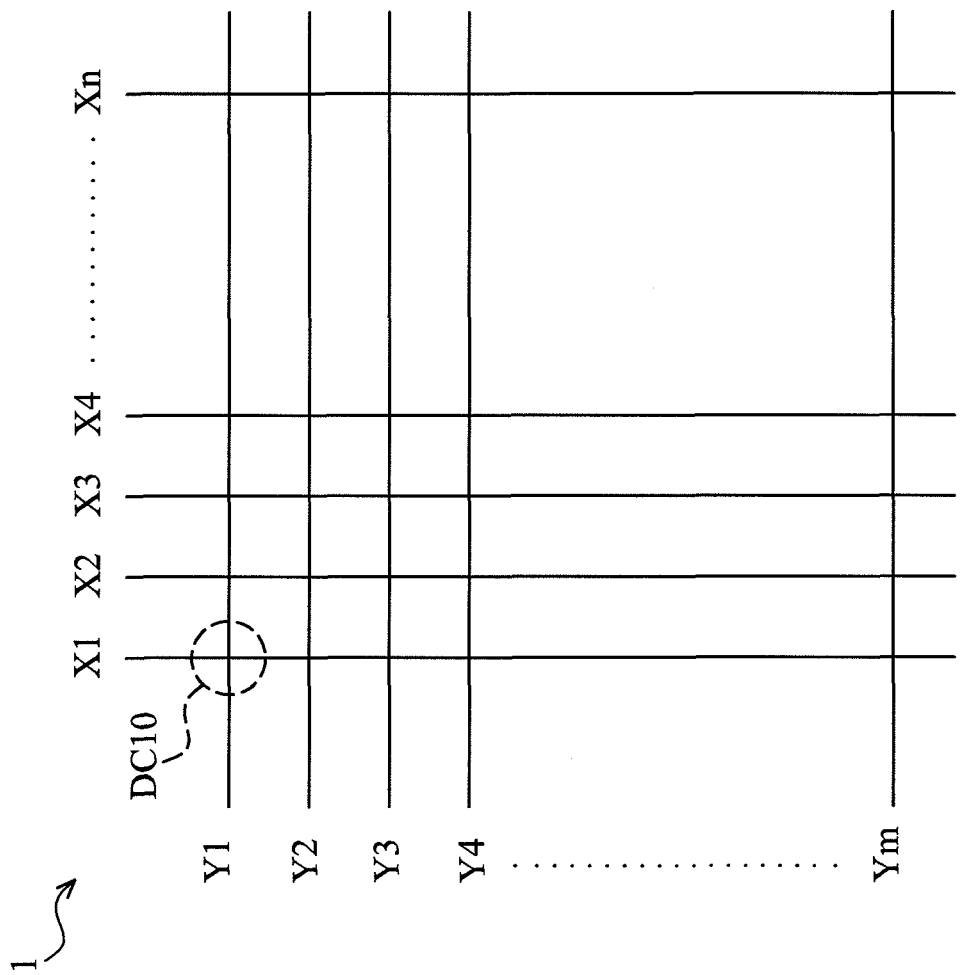
FIG. 1 shows a conventional capacitive touch panel.
Figure 4:
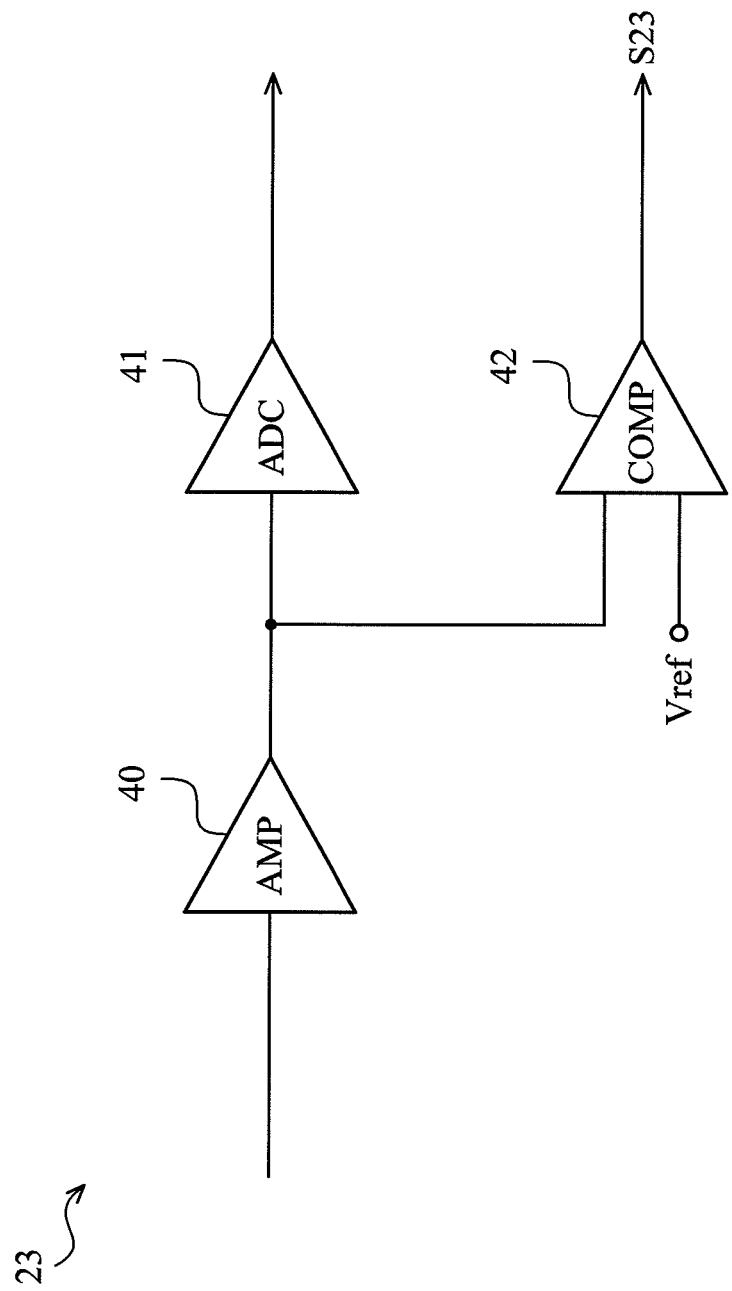
FIG. 4 shows an exemplary embodiment of the signal processing unit in FIG. 2.

FIG. 4 shows an exemplary embodiment of the signal processing unit 23 in FIG. 1. Referring to FIG. 4, the signal processing unit 23 comprises an amplifier (AMP) 40, an analog-to-digital converter (ADC) 41, and a comparator (COMP) 42. When one driving lines is scanned, the amplifier 40 receives and amplifies the voltage signals from the sensing lines Y1-Y10 sequentially. The ADC 41 converts the voltage signals of each sensing line from the analog format to the digital format for back-end digital circuits. When one driving line is scanned, the comparator 42 compares the voltage signals of the sensing lines with one reference voltage signal Vref and determines whether the corresponding sensing cell has been touched according to the comparison result to generate the detection signal S23. Accordingly, the control unit 24 generates the control signals S21 and S22 according to the detection signal S23, so that the driving unit 21 performs a scanning operation to the corresponding driving line, and the driving unit 22 performs a reading operation the corresponding sensing line.

Figure 5:
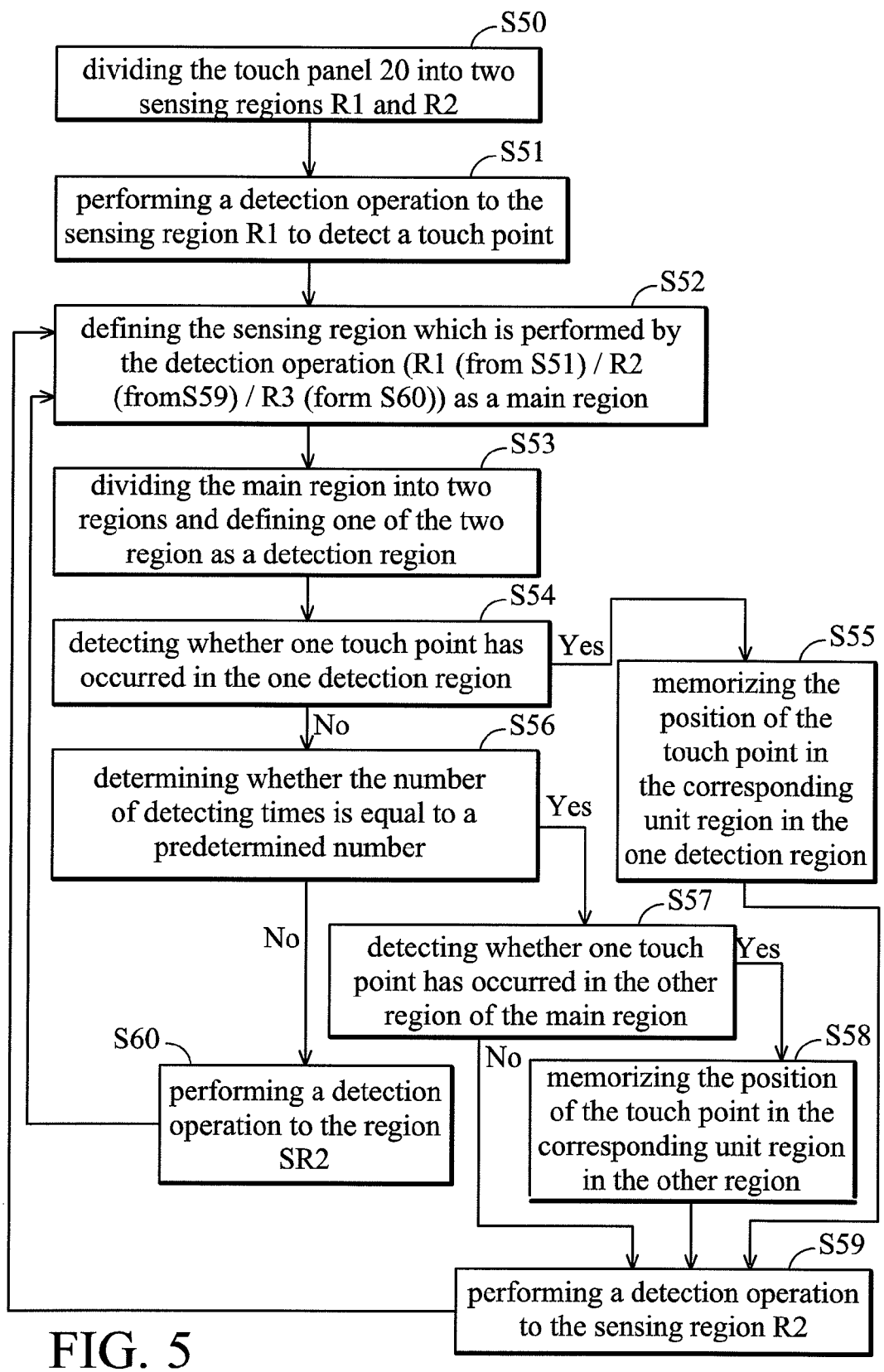
FIG. 5 is a flow chart of an exemplary embodiment of a detection method.

FIG. 5 is a flow chart of an exemplary embodiment of a detection method. The detection method of FIG. 5 may be applied to the touch device 2 of FIG. 2. First, the touch panel 20 is divided into two sensing regions R1 and R2 (Step S50). A detection operation is performed to the sensing region R1 to detect a touch point (Step S51). In the detection operation, the sensing region R1 is defined as a main region (Step S52). The main region R1 is divided into two regions SR1 and SR2, and the region SR1 is defined as a detection region (Step S53). The detection region SR1 comprises the corresponding unit regions of the driving lines X1-X4; that is, four unit regions. Then, it is detected whether one touch point has occurred in the detection region SR1 (Step S54). When one touch point has occurred in the detection region SR1 (that is the position of the touch point is detected), the position of the touch point in the corresponding unit region in the detection region SR1 is memorized (Step S55), and a detection operation is performed to the sensing region R2 (Step S59). Then, the detection method returns to Step S52. When no touch point has occurred in the detection region SR1 (that is the detecting is failed), it is determined whether the number of times of performing a detection operation (hereafter "the number of detecting times") is equal to a predetermined number (Step S56). In the embodiment, the predetermined number is set as two. Since the number of detecting times is one (to the sensing region R1) which is less than the predetermined number, a detection operation is performed to the region SR2 (Step S60).

At this time, the detection method returns to Step S52, and the region SR2 is defined as a main region (Step S52). The main region SR1 is divided into two regions SR21 and SR22, and the region SR21 is defined as a detection region (Step S53). The detection region SR21 comprises the corresponding unit regions of the driving lines X5-X6; that is, two unit regions. Then, it is detected whether one touch point has occurred in the detection region SR21 (Step S54). When one touch point has occurred in the detection region SR21, the position of the touch point in the corresponding unit region in the detection region SR21 is memorized (Step S55), and a detection operation is performed to the sensing region R2 (Step S59). Then, the detection method returns to Step S52. When no touch point has occurred in the detection region SR21, in Step S56, it is determined that the number of detecting times is equal to two (one detection operation for the sensing region R1, and the other detection operation for the region SR2) which is equal to the predetermined number. Then, it is detected whether one touch point has occurred in the other region SR22 of the main region SR2 (Step S57). When no touch point has occurred in the region SR22, a detection operation is performed to the sensing region R2 (Step S59), and then the detection method returns to Step S52. When one touch point has occurred in the region SR22, the position of the touch point in the corresponding unit region in the region SR22 is memorized (Step S58). Then, a detection operation is performed to the sensing region R2 (Step S59), and then the detection method returns to Step S52.

In the above embodiment, the area of the sensing region R1 is equal to the area of the sensing region R2. Moreover, for each detection operation (Step S52-Step S60), one main region is divided into two regions, and the area of one region is equal to the area of the region.

According to the above embodiment, the touch panel 20 is divided into several regions. When the touch device 2 desires to detect whether one sensing cell in the touch panel 20 has been touched, the control unit 24 controls the driving unit 21 to scan one driving-line group without scanning all of the driving lines X1-X16 one by one; thereby shortening detection duration and degrading resource consumption.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope the appended claims should be accorded the broadest interpretation so as to encompass all such modifications and similar arrangements.

What is claimed is:

1. A detection method for detecting a touch point on a touch panel comprising:
   (1) providing a touch panel which is divided into a plurality of sensing regions, wherein each of the sensing regions comprises different even unit regions;
   (2) defining a plurality of unit regions from the unit regions corresponding to the first sensing region as a first detection region of a first sensing region of the touch panel by a control unit; and
   (3) detecting the first detection region to obtain a position of the touch point in the corresponding unit region by a driving unit;
   wherein when the detecting obtains the position from the first detection region, stopping detecting the first sensing region and starting to detect a second sensing region;
   wherein when the detecting is failed to obtain the position from the first detection region, defining a second detection region of the first sensing region by the control unit, wherein the first detection region and the second detection region are comprised in the first sensing region and the second detection region is not comprised in the first detection region;
   wherein when the position is detected, memorizing the position into a memory unit; and
   wherein the number of unit regions of the second detection region is equal to a half of the number of unit regions of the first detection region.

2. The detection method as claimed in claim 1, further comprising:
   when the detecting is failed, determining whether the number of the detecting times is equal to a predetermined number; and
   when the number of the detecting times is equal to the predetermined number, re-defining the second detection region by the control unit.

3. The detection method as claimed in claim 1, wherein an area of the second detection region is equal to a half the area of the first detection region.

4. The detection method as claimed in claim 1, wherein after defining the second detection region of the sensing region by the control unit, the detection method returns to the step (3).

5. A touch device for controlling a touch panel connecting a plurality of driving lines and a plurality of sensing lines and being divided into a plurality of sensing regions, wherein each of the sensing regions comprises different even unit regions, wherein the driving lines interlace with the sensing lines, each set of the interlaced driving line and sensing line corresponds to a sensing cell, wherein each driving line corresponds to one of the unit regions, and the touch device comprises:
   a control unit initially defining a plurality of unit regions from the unit regions corresponding to the first sensing region as a first detection region of a first sensing region of the touch panel; and
   a driving unit coupled to the control unit and detecting the first detection region to obtain a position of a touch point in the corresponding unit region;
   wherein when the driving unit obtains the position from the first detection region, the driving unit stops detecting the first sensing region and starts to detects a second sensing region;
   wherein when the driving unit detects the position, the control unit memorizes the position into a memory unit;
   wherein when the driving unit does not detect the position, the control unit defines a second detection region of the first sensing region, wherein the first detection region and the second detection region are comprised in the first sensing region and the second detection region is not comprised in the first detection region; and
   wherein the unit regions of the second detection region is equal to a half number of unit regions of the first detection region.

6. The touch device as claimed in claim 5, wherein the driving unit comprises:
   a first driving unit coupled to the control unit and scanning the driving lines according to a first control signal from the control unit; and
   a second driving unit coupled to the control unit and sequentially reading out voltage signals on the sensing lines according to a second control signal from the control unit.

7. The touch device as claimed in claim 6 further comprising:
   a signal processing unit coupled to the second driving unit, processing the voltage signals on the sensing lines to determine whether one of the sensing cells has been touched, and generating a detection signal according to the determination result to the control unit;
   wherein the control unit generates the first control signal according to the detection signal to control the first driving unit to scan the driving lines corresponding to the first detection region and generates the second control signal according to the detection signal to control the second driving unit to read out the voltage signals on the sensing lines; and wherein the signal processing unit determines whether one of the corresponding sensing cells has been touched according to the read voltage signals on the sensing lines, and when all of the corresponding sensing cells have not been touched, the signal processing unit generates the detection signal to control the control unit to re-define the second detection region.

8. The touch device as claimed in claim 7, wherein the signal processing unit comprises:

an amplifier receiving and amplifying the voltage signals on the sensing lines sequentially;

an analog-to-digital converter converting the voltage signal on each of the sensing lines from an analog format to a digital format; and a comparator comparing the voltage signal on each of the sensing lines with a reference voltage signal and determining whether the corresponding sensing cell has been touched according to the comparison result to generate the detection signal.

9. The touch device as claimed in claim 5, wherein when the driving unit does not detect the position, the control unit determines whether the number of times of detecting the first detection region by the driving unit is equal to a predetermined number; and when the number of times of detecting the first detection region by the driving unit is equal to the predetermined number, the control unit re-defines the second detection region.

10. The touch device as claimed in claim 5, wherein an area consisting of the second detection region is equal to a half the area consisting of the first detection region.

* * * * *